United States Patent [19]

Keeling et al.

[11] Patent Number: 4,621,268

[45] Date of Patent: Nov. 4, 1986

[54] FLUID APPLICATION METHOD AND APPARATUS

[76] Inventors: Michael R. Keeling, 19 Rockmill End, Willingham, Cambridgeshire; David J. Langrick, 45 Water Lane, Oakington, Cambridgeshire, both of England

[21] Appl. No.: 698,599

[22] Filed: Feb. 5, 1985

[30] Foreign Application Priority Data

Feb. 8, 1984 [GB] United Kingdom ................. 8403304

[51] Int. Cl.[4] .......................... G01D 15/18; B05B 5/04

[52] U.S. Cl. ........................................ 346/1.1; 346/75; 239/3; 239/693

[58] Field of Search ....................... 346/1.1, 75; 239/3, 239/693

[56] References Cited

U.S. PATENT DOCUMENTS 3,656,171 4/1972 Robertson ............................ 346/1.1
3,656,174 4/1972 Robertson ............................ 346/75
4,346,387 8/1982 Hertz .................................... 346/1.1
4,489,894 12/1984 Marchant et al. .................. 239/693

*Primary Examiner*—E. A. Goldberg
*Assistant Examiner*—Gerald E. Preston
*Attorney, Agent, or Firm*—Wenderoth, Lind & Ponack

[57] ABSTRACT

Fluid is applied in droplet form to a substrate by feeding the fluid to a nozzle so that the fluid issues from the nozzle as a single substantially coherent jet following a single jet flight path, causing the jet to break up into a series of substantially uniformly sized droplets, and applying a sufficiently large electrical charge to the fluid by means of a charge electrode so as to form mutually repellant droplets having flight paths which diverge from one another. The single jet path is directed into a catching device by which the fluid is caught and prevented from being applied to the substrate. The jet of fluid is broken up into a stream of substantially uniformly spaced droplets and the divergent stream of droplets is directed away from the catching device and allowed to reach the substrate so as to deposit fluid on the substrate.

17 Claims, 2 Drawing Figures

FLUID APPLICATION METHOD AND APPARATUS

BACKGROUND OF THE INVENTION

The present invention relates to a method for applying a fluid to a substrate, notably to a method for applying ink or an adhesive to a paper or plastics sheet, carton or the like; and to apparatus for use in that method.

Conventionally, coatings of ink or adhesives are applied to substrates by means of a roller applicator. However, the applicator applies a given set pattern or swath of material and it is necessary to change the roller if a different application pattern is required. Also, the ink or adhesive tends to dry out on the surface of the roller when application is interrupted, giving rise to uneven application and/or blockage problems when the application process is re-started.

It has been proposed to apply fluids by means of a spray nozzle. This method still suffers from problems due to drying out where the application is repeatedly interrupted. Furthermore, problems are also encountered with accurate placement of the spray onto the substrate due to drift of the spray droplets in the air stream used to form the spray.

In order to overcome this problem, it has been proposed to give the fluid being sprayed and the substrate opposite electrical charges so that the droplets from the nozzle are guided by electrostatic forces onto the substrate. However, this process is primarily applied to substrates which are electrically conductive. Where a non-conductive substrate is used, for example paper or plastics articles, it is usually necessary to provide a second electrode behind or adjacent the substrate to provide a co-operating target charge to guide the fluid droplets in the desired direction. Furthermore, such methods can not be applied to the formation of accurately defined patterns on the substrate since the fluid is formed into droplets of widely varying sizes and velocities and there is little or no directional control of specific droplets in the spray. Thus, such methods cause localised over or under application of the fluid and mist formation leading to loss of the material from the desired spray path.

It has been proposed in U.S. Pat. No. 3,416,153 to apply inks to a substitute by a method in which the ink is fed under pressure to a nozzle to form a jet of ink issuing from the nozzle. Due to surface tension effects, this jet breaks up into individual droplets which are then applied to the substrate by allowing them to pass through a hole in a masking plate between the nozzle and the substrate. The droplet formation can be assisted by applying vibration and/or pressure pulses to the jet, eg. using a piezoelectric crystal. When a printed image is not required, a charge is applied to the droplets by passing them past a charge electrode operated at a voltage of up to 1000 volts with respect to the fluid issuing from the nozzle. This causes the droplets to repel each other and thus form a divergent spray of the ink which is no longer directed at the hole in the mask. Hence little or none of the ink passes through the mask to strike the substrate. The form of the image printed on the substrate is controlled by selecting which droplets are allowed to reach the substrate and by movement of the substrate to select the position at which the droplet strikes the substrate.

In an alternative form of such an on/off method for controlling the feed of droplets to the substrate described in U.S. Pat. Nos. 3,673,601 and 3,916,421, the mask is omitted and the divergent spray of droplets is directed to a catcher device by applying an electric field to the spray using a second electrode operated separately from and with a polarity opposed to that of the first electrode. The catcher can be a trough or the like into which the spray is directed. However, due to problems of build up of ink on the second electrode, it was considered necessary to form one of the electrodes as a porous material and to suck the ink attracted onto that electrode through it for collection. The collected ink was discarded and could not be re-used, due to contamination of the ink and solids therein.

Such a method suffers from the need for complex systems to control the relative movement of the substrate with respect to the nozzle so as to position the droplet in the desired position on the substrate. In practice, such methods have only found use where linear images are to be formed on the substrate, eg. for use in plotters, and have not proved practicable for other uses. Furthermore, such methods have been limited to the use of small nozzle orifices, typically less than 25 microns in diameter. This is due to the fact that the flight paths of the droplets are not accurately controlled and any errors become visually obtrusive with larger sized droplets.

SUMMARY OF THE INVENTION

We have now devised a method for applying a fluid to a substrate which reduces the problems encountered with the above methods and which can be applied to materials which will not accept an electrical charge.

Accordingly, the invention provides a method for applying a fluid in droplet form to a substrate, which method comprises forming a fluid into droplets by feeding the fluid to a nozzle so that the fluid issues from the nozzle as a single substantially coherent jet following a single jet flight path; causing the jet to break up into a series of substantially uniformly sized droplets; applying a sufficiently large electrical charge to the fluid by means of a charge electrode so as to form mutually repellant droplets having flight paths which diverge from one another, wherein the single jet flight path is directed into a catching means by which the fluid is caught and prevented from being applied to the substrate, the jet of fluid is broken up into a stream of substantially uniformly spaced droplets and in that the divergent stream of droplets is directed away from the catching means and allowed to reach the substrate so as to deposit fluid on the substrate.

Preferably, the droplets are charged by means of a charge electrode operated at a voltage of at least 1000 volts with respect to the fluid flowing through the nozzle orifice. It is also preferred that the divergent stream of droplets is deflected from the catching means by applying a sufficiently large electrical field to the stream by means of a single electrode, such electrode preferably being operated at the same polarity as the charge electrode, notably by being formed integrally therewith.

The invention also provides apparatus for applying a fluid in droplet form to a substrate which is adapted to be moved relative to the apparatus, which apparatus comprises:

- a source of fluid under pressure,
- a nozzle orifice in fluid communication with the source of fluid for discharging a single jet of fluid, means for breaking the jet of fluid up into substantially uniformly sized and spaced droplets, means lying along the flight path of the jet of fluid for catching the droplets so as to prevent their striking the substrate, means for imparting a sufficiently large charge to the fluid to cause the droplets to become mutually repellant so that they form a generally conical spray pattern having an included angle of at least 5°, and means for deflecting the charged droplets from the catching means.

Preferably, the means for deflecting the charged droplets is a single electrode, notably formed as an extension of the charge electrode for charging the droplets to form the spray. Thus, the deflection voltage is of the same polarity and value as the charge voltage. We have found that such an apparatus provides a simple means for controlling the spread of the cone of the spray of droplets, and hence the width of the swath of fluid laid down on the substrate.

The invention can be applied to a wide range of fluids, provided that the fluid is capable of accepting an electrical charge. The ability of the fluid to accept a charge is reflected in the electrical conductivity of the fluid and we prefer that the fluids for present use have a conductivity of at least 250, notably 500 to 2500, micro Siemens. Thus, the invention can be applied wherever it is desired to deposit a substantially uniform coating of droplets on a substrate. The fluid can be an ink, an adhesive, a solvent, a herbicide, pesticide or the like. The invention can also be applied in circumstances where uniformity of drop size is important, for example in spray drying of materials, eg. coffee or tea, or in calibration of, for example, nephelometers.

For convenience, the present invention will be described hereinafter in terms of the application of an adhesive formulation to a generally planar substrate.

The fluid formulation is fed under pressure to a nozzle to form a jet of fluid issuing from the nozzle, that is the nozzle does not to any significant extent form droplets at the outlet of the nozzle. This is to be contrasted with conventional spray operations where the objective is to feed the fluid under high pressure and/or mixed with an air stream so that atomization of the fluid occurs at the outlets to the nozzle giving rise to randomly sized, spaced and directed droplets. The optimum pressure for present use will depend in any given case upon, inter alia, the diameter of the nozzle, the length of the nozzle bore and the formulation being fed to the nozzle and can readily be determined by simple trial and error tests. However, as a general guide, we have found that satisfactory results are usually obtained by forming a jet in which the droplets are spaced at from 3 to 10 times the nozzle orifice diameter with a fluid composition having a viscosity of from 2 to 200, notably from 5 to 70, cps at 25° C. applied through a nozzle from 35 to 400, preferably from 70 to 250, microns diameter at a pressure of from 0.3 to 8 bar.

The nozzle through which the fluid is fed and the feed mechanism are typically of conventional design, e.g. as used in ink jet printing processes. Thus, the method of the invention can be applied using a conventional jewelled nozzle outlet fed with fluid under pressure via a suitable pressure line or via a distribution manifold. The nozzle can be one of a group in a linear or staggered array fed from a distribution manifold.

It is particularly preferred that the fluid flows substantially continuously through the nozzle, with the stream of uncharged droplets being caught in a gutter or catcher between the nozzle and the substrate when placement of the fluid on the substrate is not wanted, e.g. during interruptions in the printing run or where there are to be gaps between the patterns or images being deposited on the substrate.

The jet of fluid issuing from the nozzle will break up into individual droplets of its own accord due to surface tension effects as it travels towards the substrate. However, this may result in droplets of varying sizes and inconsistent spacing. It is therefore preferred to cause the jet to break up into individual droplets in a controlled manner, for example by applying pressure pulses in the flow of ink to the nozzle, by vibrating the nozzle axially and/or transversely or by applying sonic or ultra sonic vibrations to the liquid.

A particularly preferred method for causing the jet to break up into droplets is to apply pulses to the fluid by means of a piezoelectric crystal. The crystal can form part of the wall of the distribution manifold serving a group of nozzles or can form part of the individual nozzle assembly.

We have found that the formation of the droplets using pressure pulses or vibration has the advantage that the stream of droplets follow the single jet flight path for some distance before they diverge noticeably under the influence of the electrical charge applied to the droplets as described below. This enables the catching means to be located at a point where the stream of charged droplets has begun to diverge only slightly from the single jet flight path. As a result, a comparatively small deflection voltage is required to deflect the stream of droplets away from the catching means when the fluid is to be deposited on the substrate. Also, this enables a comparatively sharp transition from the printing mode to the droplet catching mode to be achieved, thus enhancing the sharpness of the image formed on the substrate. This is particularly important where large sized droplets, ie. greater than 35 microns diameter and notably greater than 70 microns, are to be used.

The droplets formed from the jet of fluid preferably have a size within the range 70 to 800, typically 140 to 200, microns diameter. The optimum size of the droplet for a given application and formulation being applied can be readily determined and the desired droplet size achieved by conventional techniques.

The droplets formed from the jet of fluid are then charged sufficiently for them to become mutually repellant so that they follow divergent flight paths to give a generally conical spray pattern. As stated above, the cone has an included cone angle of at least 5°. This is to be contrasted with conventional ink jet printing techniques where the charge induced on the droplets is less than that required to cause any significant mutual repulsion. The extent of the spread of the cone pattern will depend, inter alia, upon the weight and velocity of the droplets and the voltage applied to the droplets and the optimum angle can be readily determined for each case.

The charge given to the droplets is not so large as to cause the electrostatic repulsion between the droplets to overcome the surface tension forces holding the fluid in droplet form and thus cause the droplets to form an uncontrolled mist of fine droplets. The charge is dependant, inter alia, upon the voltage applied. The maximum voltage is given by the equation:

$$q_{max} = \sqrt{\frac{64\,\pi^2\,\epsilon_o\,d_d^3\,\delta}{8}}$$

where:

$\epsilon_o$=permittivity of free space $d_d$=drop diameter $\delta$=surface tension and q=Vc where c is the capacitance of the charge electrode to the liquid stream and V is the applied voltage.

We have found that satisfactory results are obtained when the droplets are subject to voltage in the range 1000 to 5,000, preferably from 1500 to 3000, volts with a jet to electrode separation of from 0.5 to 5 mms so as to give a cone angle of from 20° to 30°.

The desired charging of the droplets can readily be achieved by passing them between or adjacent to one or more charged plates or electrodes of a type similar to those used in an ink jet printing device. The electrode can be in the form of a single plate serving a number of nozzles or an individual nozzle, or can take the form of a generally cylindrical or slotted electrode surrounding each individual jet of fluid. The electrodes are preferably mounted around that area of the jet where break up into droplets occurs. Where the fluid flows continuously through the nozzle, the charging of the electrodes can be controlled in synchronisation with the passage of the substrate past the nozzle so that charging occurs only when application of fluid to the substrate is required. Where application of the fluid is not required, the droplets are not charged and are collected in the gutter or catcher as described below.

As stated above, a catching means, eg. a gutter or catcher, is provided in the line of flight of the uncharged droplets, which is substantially the same as the flight path which the jet of fluid would describe. The gutter can take any suitable form and is preferably a static trough or other device located at any suitable point between the nozzle orifice and the substrate to be printed, with the cone spray being deflected to avoid the catching means. However, it is also within the invention to maintain the flight path of the spray static and to swing or otherwise move the catching means out of the flight path of the spray when deposition of fluid on the substrate is required. Preferably, the catching means feeds the caught fluid back to the fluid reservoir feeding the nozzle for re-use.

In the preferred method of the invention, the stream of charged droplets is subjected to a deflecting force which deflects the droplets from the catching means and allows them to be deposited onto the substrate. This second electric field can be generated by an electrode operated independently from that used to charge the droplets. Thus, the method of the invention may be carried out using a conventional ink jet apparatus which has been modified to accept a voltage of 1000 volts or more on the charge electrode and with the deflection electrodes separated sufficiently to prevent fluid being deposited on them.

However, it is preferred to use an apparatus in which the deflecting field is provided by a single electrode operated at the same voltage and polarity as the droplet charging electrode. This is particularly conveniently achieved by extending the charging electrode some distance along the flight path of the stream of charged droplets. This extension acts to attract the stream of droplets, thus controlling the direction in which the droplets travels. In this way, it is possible to charge the droplets and to deflect their flight path from the catching means without the need to move the catching means.

Such a combination of the charge and deflection electrodes provides a simple construction for the apparatus and provides a measure of automatic inter-relationship between the extent of charge on the droplets and the deflection force required to deflect them away from the catching means.

If desired, the face of the deflection electrode, eg. the extension to the charging electrode, can be shaped to reflect the desired path of the stream of droplets so as to reduce the risk of deposition of fluid on the electrode.

The method of the invention provides a means for applying a substantially uniform coating of fluids onto a substrate where the placement of the fluid on the substrate is to be varied yet must be accurately controlled. We have found that mutual repulsion occurs between the droplets from adjacent nozzles and that it is therefore possible to lay down closely adjacent or overlapping spray patterns from two or more nozzles onto a substrate with a reduction in the localised overspraying which occurs with conventional spray application techniques. The method of the invention thus enables a broad coating of fluid to be applied to a substrate over one part of the printing pattern and yet to reduce the pattern to a fine line or other shaped pattern at other points in the printing operation without the need to interrupt the operation. Since the fluid not to be applied to the substrate is caught by the catching means, ie. is positively removed from the flight path towards the substrate, there is a sharp cut off between the printing and non-printing modes of the method of the invention.

BRIEF DESCRIPTION OF THE DRAWINGS

The invention will now be described by way of illustration with respect to two preferred forms thereof as shown in the accompanying drawings which are diagrammatic schematic views of two forms of device for use in the invention.

DETAILED DESCRIPTION OF THE INVENTION

Figure 1:
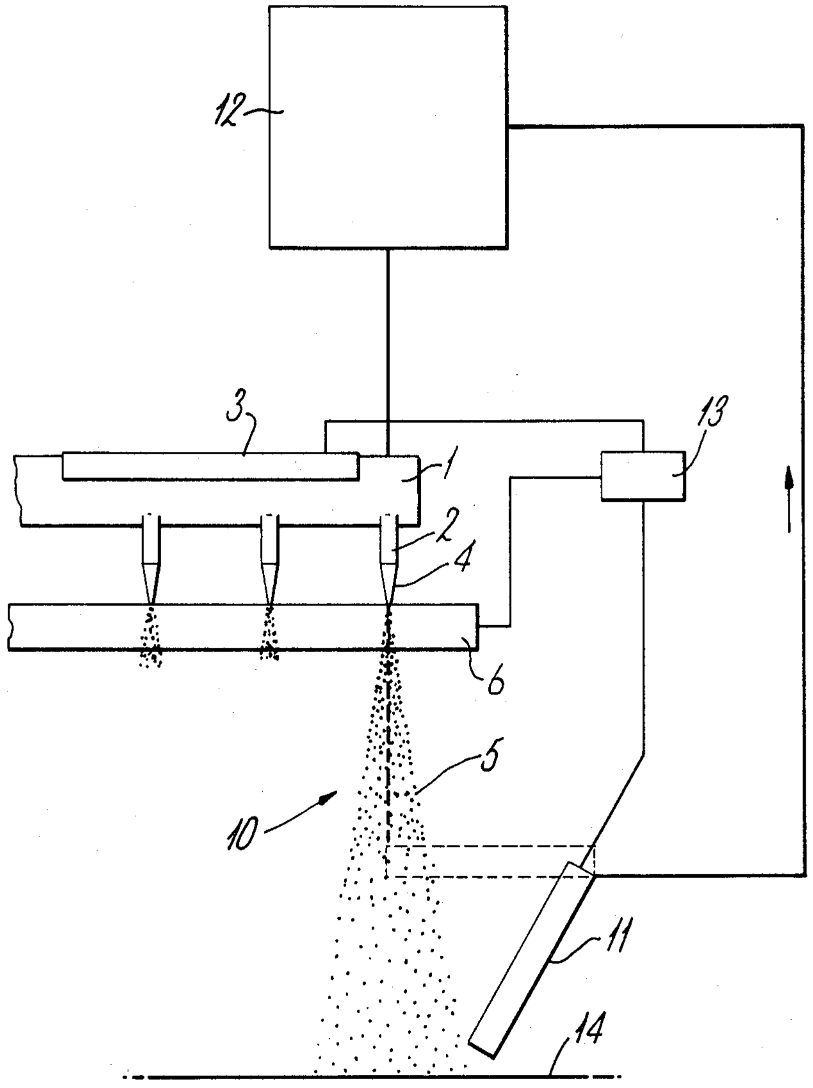
FIG. 1, a profile view, depicts the ink jet printer's deflection electrode in the vicinity of droplet formation for controlling the spray direction, the gutter positionable into or away from the spray path.

In the device shown in FIG. 1, adhesive having a viscosity of 45 cps at 25° C. and a conductivity of 5 milli Siemens is fed under a pressure of 2 bar to a manifold 1 serving a linear array of jewelled orifice nozzles 2. The nozzles have an orifice diameter of 182 microns and the top wall 3 of the manifold 1 is provided in part by a piezo-electric material which is stimulated by a time varying voltage signal, e.g. a sine wave, as with a conventional ink jet system, under the control of a suitable control system.

The nozzles are operated so that a stream of adhesive 4 issues from the nozzles, and breaks up into discrete substantially uniformly sized droplets 5 under the influence of the vibration caused by piezo-electric unit 3.

Typically, the droplets will have a mean diameter of 360 microns.

The droplets pass at a distance of 4 mm from a 10 mm long charge electrode 6 which is held at 5 Kv volts with respect to the fluid jet to induce a charge on them. This voltage is to be contrasted with the 200–300 volts achieved with a conventional ink jet printing device.

The charge on the droplets causes them to repel one another to give a generally conical spray pattern 10 with a cone angle of 20°–30°. When no charge is applied to the droplets, they follow a generally straight flight path shown dotted. In the flight path of the uncharged droplets is located a gutter 11 which traps the uncharged droplets and returns them to the adhesive reservoir 12 for re-use.

Figure 2:
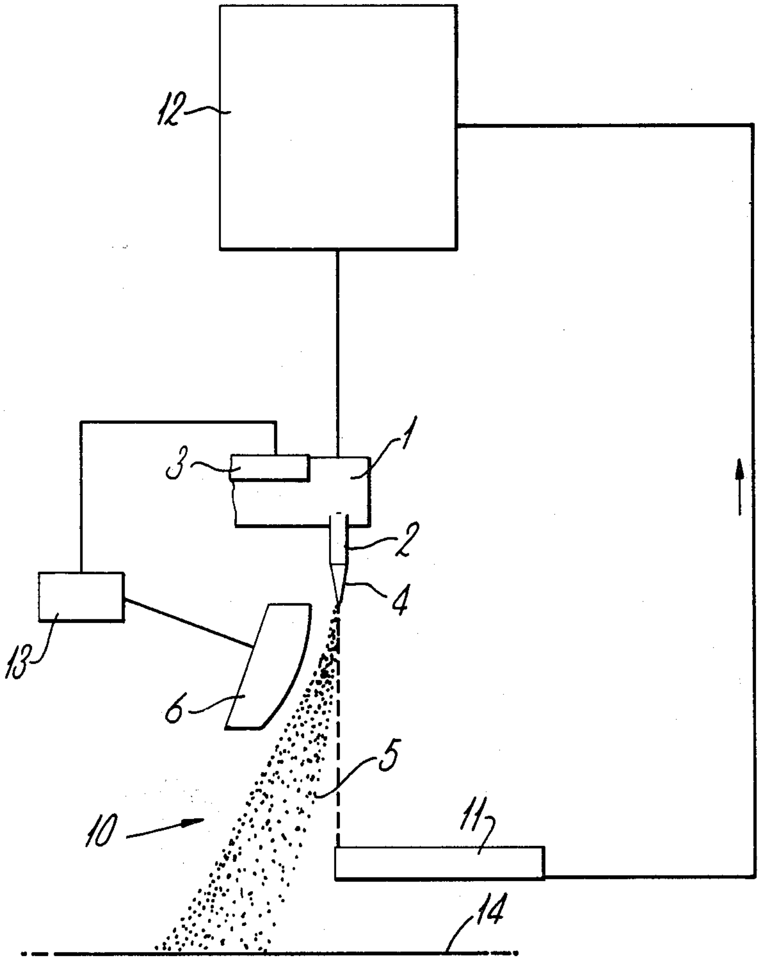
FIG. 2, also a profile view, shows the spray pattern controlled downstream by the deflection electrode extending along the path to direct the spray away from the gutter.

In the device of FIG. 1, the gutter 11 is mounted so that it can be swung out of the path of the charged droplets, as shown dotted in FIG. 1 for the uncharged position. In the device of FIG. 2, the gutter is static and the stream of droplets is deflected away from the gutter.

The position of placement of the stream of droplets from the device of FIG. 1 on a substrate 14 can be controlled by a second or deflection electrode located downstream of the charge electrode 6. This electrode can be operated separately and with the same or different polarity to the charge electrode so that the spray of droplets can be deflected towards or away from the deflection electrode.

In the device of FIG. 2, the charge electrode 6 extends a further 14 mm along the flight path of the droplets to provide a deflection electrode which is operated together with the charge electrode and at the same polarity as the charge electrode, thus providing a simplified construction and operation of the apparatus. The extension of the charge electrode causes the flight path of the stream of charged droplets to be attracted towards the deflection electrode by at least half the cone angle of the stream of droplets, so that the droplets miss the fixed gutter and strike the substrate.

The charging of the droplets, the operation of the gutter pivot or the deflection of the charged droplets and the operation of the piezo-electric unit 3 are conveniently operated in synchronisation by a microprocessor control unit 13 to give the desired placement pattern of fluid upon the substrate 14.

Since the placement of the droplets upon the substrate is not dependant upon the charging or earthing of the substrate, as with conventional electrostatic spraying techniques, the method of the invention can be applied to a wide range of substrates, notably paper, card or plastics. The invention can be used wherever a substantially uniform deposition of fluid on a substrate is required, eg. in applying coatings or in applying patterns of varying shape to a substrate. Since the droplets are produced as substantially uniformly sized drops which behave aerodynamically in a consistent manner, the invention can be applied to the deposition of fluids onto substrates of complex and varied shapes, as when a pesticide is applied to a plant. The invention can also be applied to the formation of a stream of droplets in a spray drying process.

The invention is of especial use in the application of adhesives to paper or other substrates. The method achieves simple and accurate placement of the fluid over a broad or narrow area of the substrate with a simple apparatus. This enables a single nozzle to achieve a broad spread of the fluid on a substrate which cannot be achieved with a conventional ink jet printer.

We claim:

1. A method for applying a fluid in droplet form to a substrate, said method comprising:

feeding the fluid to a nozzle such that said fluid issues from said nozzle as a single substantially coherent jet following a single flight path directed toward a catching means by which the fluid is caught and prevented from being applied to the substrate;

applying a sufficiently large electrical charge to said single jet of fluid by means of a charge electrode so as to form a plurality of mutually repellant charge fluid droplets having flight paths which diverge from one another to form a generally conical spray of charged fluid droplets; and causing relative movement between said catching means and said conical spray of charged droplets, thereby to prevent said charged droplets from being caught by said catching means and allowing said charged droplets to reach said substrate, when it is desired to deposit fluid on said substrate.

2. A method as claimed in claim 1, wherein said applying comprises operating said charge electrode at a voltage of at least 1000 volts with respect to said fluid issuing through an orifice of said nozzle.

3. A method as claimed in claim 1, wherein said causing comprises deflecting said conical spray of charged droplets from said catching means by applying an electrical field to said conical spray of droplets by means of a deflecting electrode located downstream of said charging electrode.

4. A method as claimed in claim 3, comprising operating said deflecting electrode at the same polarity and voltage as said charging electrode.

5. A method as claimed in claim 4, wherein said deflecting electrode is formed as an extension of said charging electrode.

6. A method as claimed in claim 1, comprising subjecting said single jet of fluid to pulses to induce controlled formation of the droplets.

7. A method as claimed in claim 6, comprising causing said single jet of fluid to break up into droplets by applying said pulses to said fluid by means of a piezoelectric crystal.

8. A method as claimed in claim 1, wherein said fluid has a conductivity of at least 250 micro Siemens.

9. A method as claimed in claim 1, wherein said fluid is selected from ink and adhesive compositions having a viscosity of from 2 to 200 cps at 25° C.

10. A method as claimed in claim 1, wherein said droplets have a diameter greater than 70 microns.

11. An apparatus for applying a fluid in droplet form to a substrate, said apparatus comprising:

a source of fluid under pressure;

a nozzle in fluid communication with said fluid source for discharging said fluid as a single substantially coherent stream following a single flight path;

means, located along said flight path, for catching said fluid and thereby for preventing said fluid from being applied to a substrate;

means for applying a sufficiently large electrical charge to said single jet of fluid so as to form a plurality of mutually repellant charged fluid droplets having flight paths which diverge from one another to form a generally conical spray of charged fluid droplets; and means for causing relative movement between said catching means and said conical spray of charged droplets, thereby to prevent said charged droplets from being caught by said catching means and allowing said charged droplets to reach the substrate, when it is desired to deposit fluid on the substrate.

12. An apparatus as claimed in claim 11, wherein said movement causing means comprises means for deflecting said conical spray of charged droplets away from said catching means.

13. Apparatus as claimed in claim 12, wherein said deflecting means comprises a deflection electrode.

14. Apparatus as claimed in claim 13, wherein said deflection electrode is formed as an extension of an electrode forming said means for applying a charge.

15. Apparatus according to claim 11, in the form of an ink jet apparatus modified to accept a voltage of at least 1000 volts at a charge electrode thereof and having at least one deflection electrode sufficiently spaced from said conical spray of charged droplets that fluid is not deposited on said deflection electrode.

16. Apparatus as claimed in claim 11, comprising a plurality of nozzles and charging electrodes.

17. Apparatus as claimed in claim 16, wherein each said nozzle is provided with respective charging and deflection electrodes which are capable of being operated independently of the electrodes serving other said nozzles.

* * * * *